(12) United States Patent
Jeltsch

(10) Patent No.: US 9,829,126 B2
(45) Date of Patent: Nov. 28, 2017

(54) COLLAPSIBLE HOSE FOR A PAINTING SYSTEM

(71) Applicant: Wagner Spray Tech Corporation, Plymouth, MN (US)

(72) Inventor: Thomas Rainer Jeltsch, Friedrichshafen (DE)

(73) Assignee: Wagner Spray Tech Corporation, Plymouth, MN (US)

( * ) Notice: Subject to any disclaimer, the term of this patent is extended or adjusted under 35 U.S.C. 154(b) by 404 days.

(21) Appl. No.: 14/561,485

(22) Filed: Dec. 5, 2014

(65) Prior Publication Data

US 2015/0159784 A1 Jun. 11, 2015

Related U.S. Application Data

(60) Provisional application No. 61/913,702, filed on Dec. 9, 2013.

(51) Int. Cl.
| | |
|---|---|
| *F16L 3/00* | (2006.01) |
| *F16L 11/12* | (2006.01) |
| *B08B 9/032* | (2006.01) |
| *B44D 3/00* | (2006.01) |

(52) U.S. Cl.
CPC ............ *F16L 11/121* (2013.01); *B08B 9/032* (2013.01); *B44D 3/00* (2013.01); *F16L 11/12* (2013.01); *F16L 11/122* (2013.01); *Y10T 137/0424* (2015.04)

(58) Field of Classification Search
CPC ............................... F16L 11/121; B05B 9/032
USPC ................. 138/106, 109, 116, 117
See application file for complete search history.

(56) References Cited

U.S. PATENT DOCUMENTS

| | | | | | |
|---|---|---|---|---|---|
| 781,349 | A | * | 1/1905 | Moore | ...................... D03D 3/00 138/119 |
| 1,053,933 | A | * | 2/1913 | Stowe | ...................... F16L 11/10 138/119 |
| 1,301,354 | A | * | 4/1919 | Baird | ...................... F16L 11/10 138/119 |
| 3,508,587 | A | * | 4/1970 | Mauch | .................. F16L 11/121 138/119 |
| 3,980,104 | A | | 9/1976 | Kabai | |
| 4,131,399 | A | * | 12/1978 | Calvet | ................. F04B 43/0072 138/118 |

(Continued)

FOREIGN PATENT DOCUMENTS

| | | |
|---|---|---|
| JP | H07158777 A | 6/1995 |
| JP | 2009007986 A | 1/2009 |

OTHER PUBLICATIONS

International Search Report and Written Opinion for International Application No. PCT/US2014/068738 dated Apr. 17, 2015, date of filing: Dec. 5, 2014, 15 pages.

(Continued)

*Primary Examiner* — Vishal Pancholi
(74) *Attorney, Agent, or Firm* — Katherine M. Scholz; Kelly, Holt & Christenson, P.L.L.C.

(57) ABSTRACT

A flexible paint hose has a first end, a second end, and a continuous conduit wall extending from the first end to the second end. The continuous conduit wall has a cross-section absent of an edge, and a non-circular cross-sectional shape in a first state and a substantially circular cross-sectional shape in a second state.

21 Claims, 5 Drawing Sheets

(56) References Cited

U.S. PATENT DOCUMENTS

| | | | |
|---|---|---|---|
| 5,561,453 A * | 10/1996 | Shibata | F16L 11/121 |
| | | | 138/118 |
| 5,678,609 A | 10/1997 | Washburn | |
| 6,955,189 B1 * | 10/2005 | Weyker | F16L 11/121 |
| | | | 138/104 |
| 7,261,325 B2 * | 8/2007 | Lien | F16L 33/223 |
| | | | 285/247 |
| 2009/0242064 A1 * | 10/2009 | Lai | F16L 3/26 |
| | | | 138/117 |
| 2011/0297756 A1 | 12/2011 | Peterson et al. | |
| 2012/0234425 A1 | 9/2012 | Berardi | |

OTHER PUBLICATIONS

International Preliminary Report on Patentability for International Patent Application No. PCT/US2014/068738, dated Jun. 23, 2016, date of filing: Dec. 5, 2014, 12 pages.

* cited by examiner

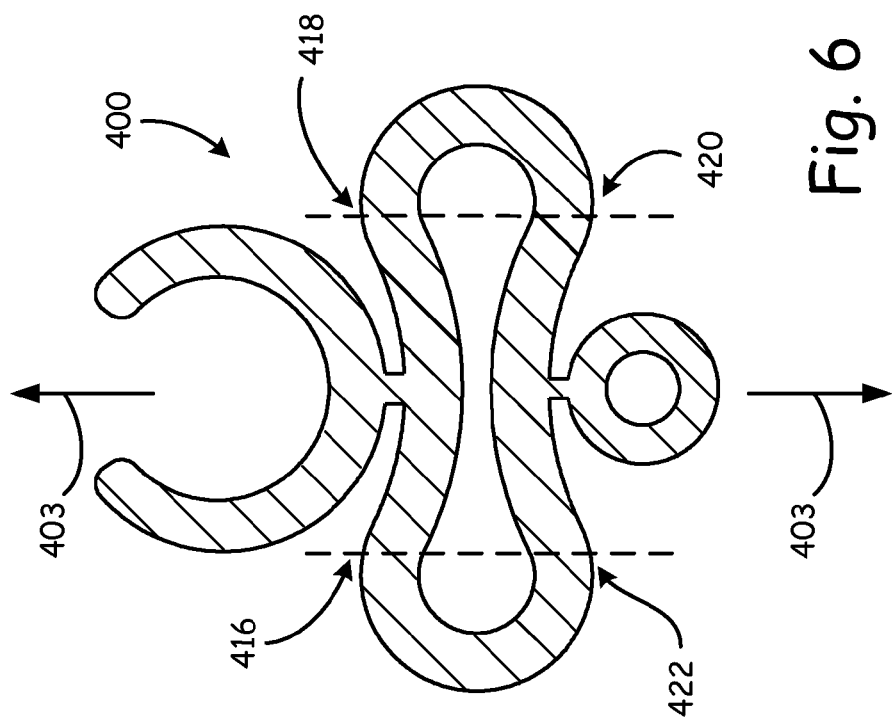
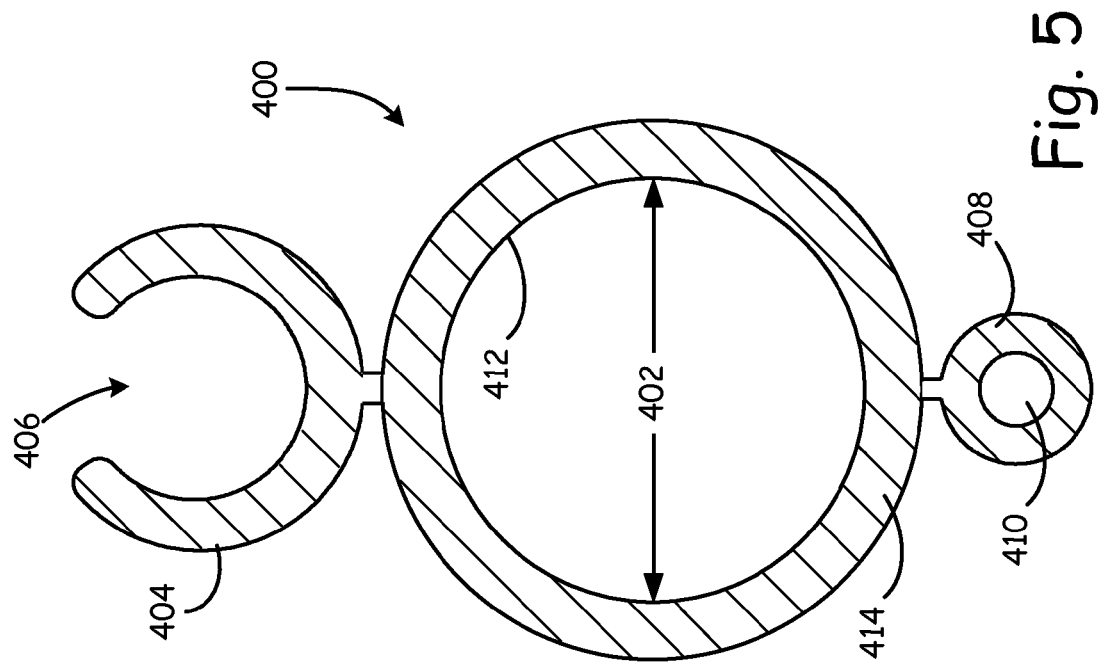

COLLAPSIBLE HOSE FOR A PAINTING SYSTEM

CROSS-REFERENCE TO RELATED APPLICATIONS

The present application is based on and claims the benefit of U.S. Provisional Patent Application Ser. No. 61/913,702, filed Dec. 9, 2013, the content of which is hereby incorporated in its entirety.

BACKGROUND

A paint system works by pumping paint through a hose and out an applicator. Examples of applicators include, but are not limited to, rollers, spray tips, and brushes. The tip is designed to break up the paint evenly for the applicator to convey the paint onto a surface. Using different tips, the paint system can spray thin liquids like stain, lacquer and varnish or thicker liquids like latex house paint. A painting system can also be used to apply a finish on doors, cabinets and woodwork. Furthermore, the paint system can be used to apply a lot of material in a short time. This makes a paint system well suited for large paint jobs, like priming bare drywall in a new house or painting a fence.

After using a paint system, paint residue can remain in the equipment. When the hose of the paint system is exposed to fresh paint later, the residue paint left in the hose can cause streaks in the new finish or solidify and cause build up between subsequent usages. To remove residue paint from the hose, a system can be used to pump solvent through the hose to flush out the remaining paint.

SUMMARY

According to embodiments of the present disclosure, a flexible paint hose is disclosed. In various embodiments, the paint hose may include a first end, a second end, and a continuous conduit wall extending from the first end to the second end. The conduit wall may include a cross-section absent of an edge, a non-circular cross-sectional shape in a first state, and a substantially circular cross-sectional shape in a second state.

According to embodiments of the present disclosure, a flexible paint hose is disclosed. In various embodiments, the paint hose may include a first end, a second end, and a continuous conduit wall extending from the first end to the second end. The conduit wall may include a cross-sectional shape with at least two inflection points in a collapsed state.

According to embodiments of the present disclosure, a paint hose is disclosed. In various embodiments, the paint hose may include a first end, a second end, and a conduit wall extending from the first end to the second end. The conduit wall may include a cross-section, in a collapsed state, shaped like a peanut.

According to embodiments of the present disclosure, a method is disclosed for using a flexible paint hose having a conduit wall. The method may include connecting the flexible paint hose to a paint system having a paint source containing paint. The method may also include conveying the paint through the flexible hose at a first pressure sufficient to expand the conduit wall radially to a substantially circular shape. In addition, the method may include connecting the flexible paint hose to a solvent system having a solvent source containing solvent. Also, the method may include conveying the solvent through the flexible hose at a second pressure sufficient to expand the conduit wall from a collapsed state. Furthermore, the method may include removing a remaining portion of the paint from the flexible paint hose in response to the pumping of the solvent.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

FIG. 5 depicts a cross-section view of an embodiment of a collapsible hose in an open state, consistent with embodiments of the present disclosure;

FIG. 6 depicts a cross-section view of an embodiment of the collapsible hose in a collapsed state, consistent with embodiments of the present disclosure;

Figure 1:
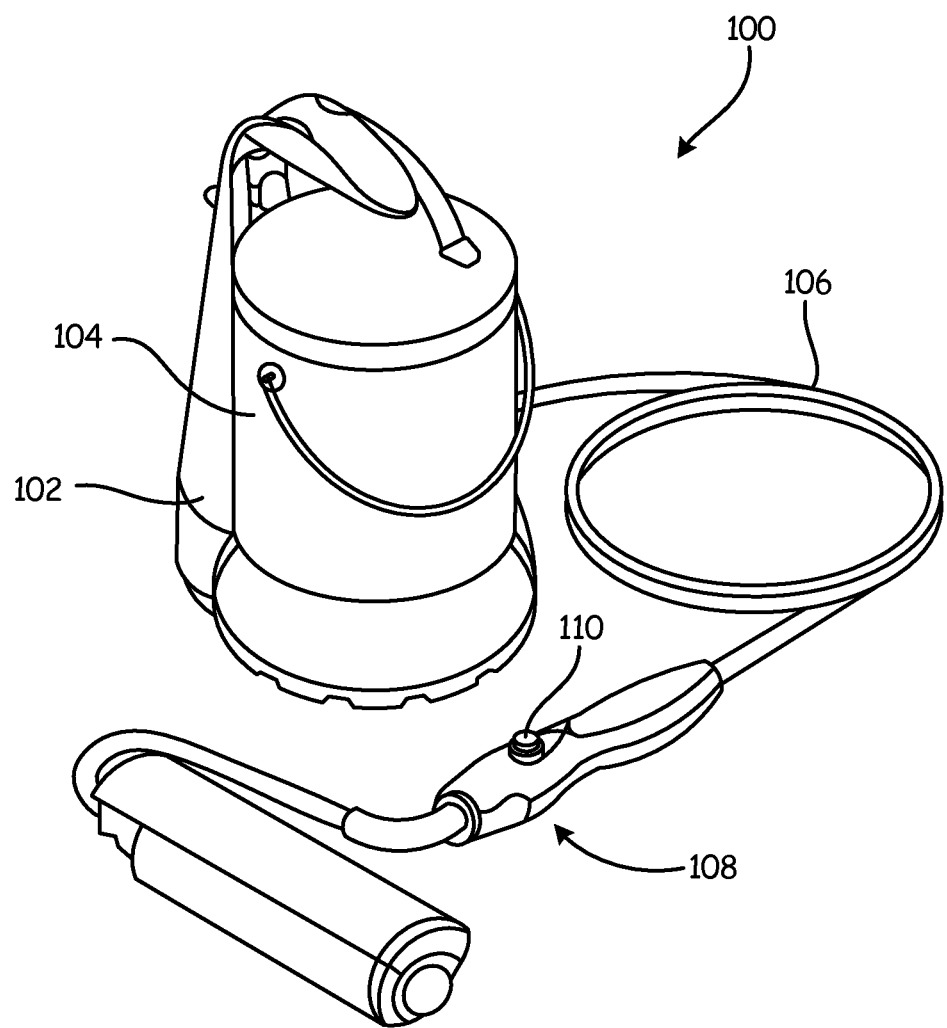
FIG. 1 depicts an exemplary painting system, consistent with embodiments of the present disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to a hose for conveying a liquid material, more particular aspects relate to a flexible hose for a painting system. While the present disclosure is not necessarily limited to such applications, various aspects of the disclosure may be appreciated through a discussion of various examples using this context.

Various embodiments of the present disclosure are directed toward a flexible hose having a conduit wall. The conduit wall can have a cross-section that changes shape depending on the amount of liquid flowing through the flexible hose. According to certain embodiments, the cross-section of the conduit wall can increase to allow a first liquid to be dispensed at a pressure that is suitable for certain applications. The cross-section of the conduit wall can then decrease to allow a second liquid to flow through the flexible hose at a pressure that can be beneficial to a particular task. For example, in certain embodiments, the flexible hose can be used to convey liquid paint onto a surface. For various reasons (e.g., splashing of the conveyed paint to unwanted surfaces), it may be desirable that the conveyed paint be dispensed at less than or equal to a maximum pressure. To prevent the conveyed paint from reaching this maximum pressure, the cross-section of the conduit wall can expand. As the pressure of paint flowing through the flexible hose increases, the conduit wall can expand and increase the cross-sectional area that the paint flows through. As a result, the pressure at which the paint would have flowed through the flexible hose for a given volumetric flow rate can be reduced and potentially decrease the amount of paint that is dispensed onto unwanted surfaces.

In particular embodiments, left over portions or residue of conveyed paint may need to be removed from the flexible hose (e.g., a different color paint needs to be conveyed and it cannot be mixed with the previously conveyed paint). In certain embodiments, a solvent can be run through the flexible hose to remove and clean out the portions of leftover paint. Often, the solvents used to clean a hose have less viscosity than paint. As a result, the solvents may require less pressure to push through the flexible hose. According to various embodiments, the drop in pressure can allow the conduit wall to collapse. The collapsing of the conduit wall can decrease the cross-sectional area of the flexible hose. The velocity of a solvent, with a given flow rate, can therefore, increase as the cross-sectional area of the flexible hose decreases. As a result, the time it takes to remove left over portions or residue from the flexible hose, can potentially be reduced.

Embodiments of the present disclosure will now be described more fully hereinafter with reference to the accompanying figures. However, there can be several embodiments of the present invention and should not be construed as limited to the embodiments set forth. The embodiments disclosed are provided so that this disclosure can fully convey the scope of the invention to those skilled in the art. Therefore, the following detailed description is not to be taken in a limiting sense.

An exemplary painting system 100 is illustrated in FIG. 1, consistent with embodiments of the present disclosure. Painting system 100 includes a pump located in a housing 102 that is configured to pump paint from a paint container 104. The pump in exemplary painting system 100 comprises a peristaltic pump that outputs paint under pressure through an outlet hose 106 to a paint applicator 108, which illustratively comprises an internally fed roller assembly. In other examples, different types of pumps and applicators can be utilized (e.g., air pumps).

The outlet hose 106 can be made from one or a combination of many different materials that include, but are not limited to, nylon, polyurethane, polyethylene, PVC, Teflon, or synthetic or natural rubbers, based on the environment and pressure rating needed. The outlet hose 106 can also have a length that enables a user to move about a work site with paint applicator 108 while keeping the pump and container 104 in a stationary position. In one example, but not by limitation, hose 106 has a length between 10 and 40 feet. In accordance with one embodiment, at least a portion of outlet hose 106 is collapsible such that its inner cross-sectional area changes in response to varying fluid pressures. The collapsible portion of the hose can comprise some or all of a length of the hose.

According to particular embodiments, the painting system 100 can be configured to pump both paint and a solvent. As a result, the outlet hose 106 can receive both paint and solvent from the painting system 100. For example, the paint can be loaded into the paint container 104. A user can then activate the pump by pressing a button 10. Upon activation, the pump can pump the paint from the paint container 104 into the outlet hose 106. The paint can then flow through the outlet hose 106 and be conveyed onto a surface using the paint applicator 108. In various embodiments, when the conveying of the paint onto the surface is complete, a user may want to convey a second paint (e.g., different colored paint) onto the same surface or a different surface. In this case, the user may not want the second paint to mix with portions of the first paint that have been left in the outlet hose 106. Accordingly, the first paint that remains in the paint container 104 can be removed and a solvent can be loaded into the paint container 104. The user can then activate the pump by pressing the button 10. Upon activation, the pump can pump the solvent from the paint container 104 into the outlet hose 106. The solvent can then flow through the outlet hose 106 and remove the portions of the first paint left in the outlet hose 106. The user can then remove the remaining solvent from the paint container 104, load the second paint, and convey the second paint accordingly.

In another embodiment, the outlet hose 106 can receive paint and solvent from two separate systems. For example, the outlet hose 106 can be used in conjunction with the housing 102, the paint container 104, the applicator 108, and the button 110 of the paint system 100 to convey paint as described above. However, when remaining portions of paint need to be removed from the outlet hose 106, the outlet hose 106 can be removed from the painting system 100. The outlet hose 106 can then be connected to a solvent system (e.g., a water faucet) and the solvent system can pump the solvent into the outlet hose 106, removing the portions of paint that remain in the outlet hose 106.

Figure 2:
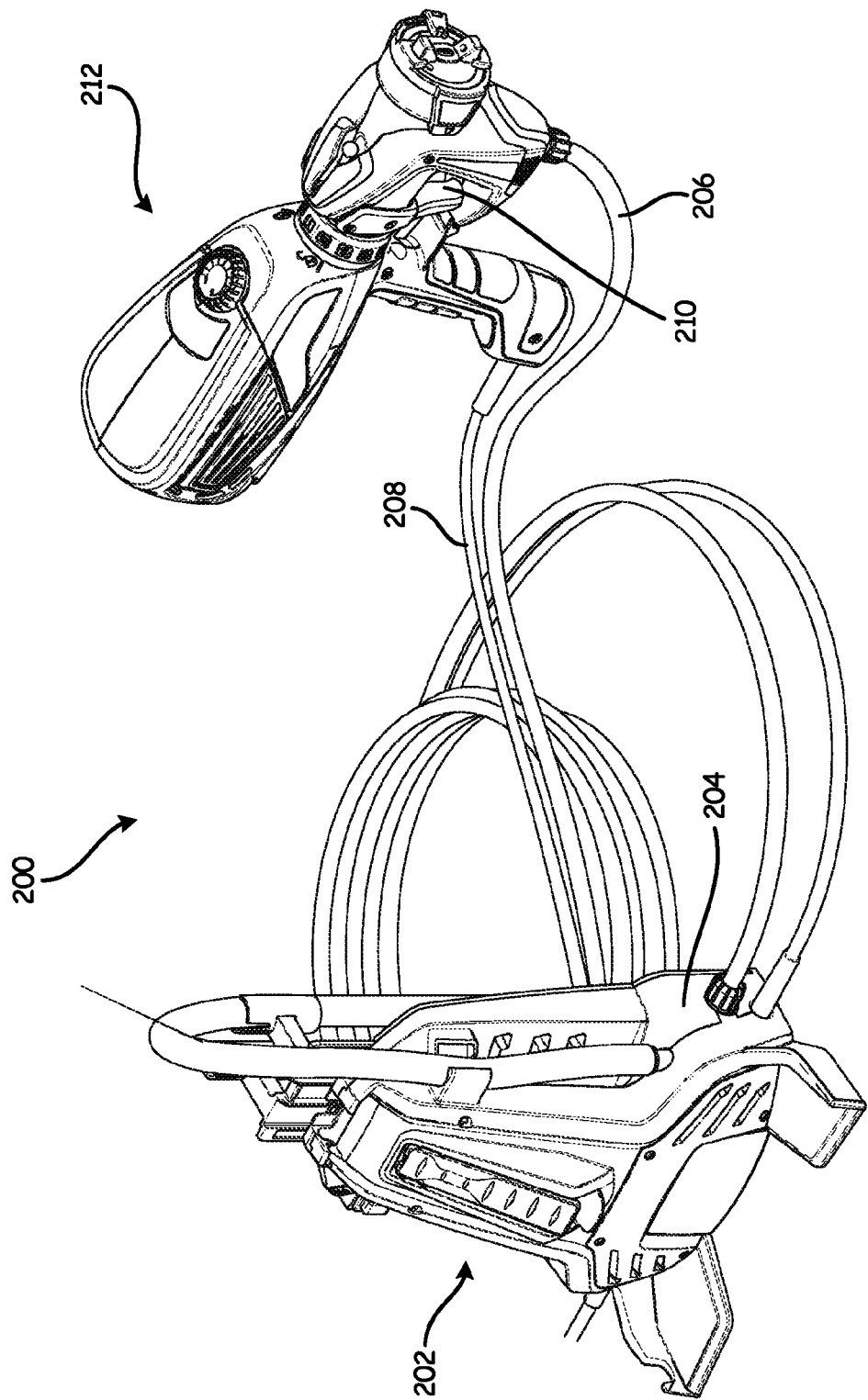
FIG. 2 depicts an exemplary painting system, consistent with embodiments of the present disclosure.

An exemplary painting system 200 is illustrated in FIG. 2, consistent with embodiments of the present disclosure. Painting system 200 operates similar to painting system 100. However, painting system 200 includes an air compressor (not shown) located in a housing 202 that is configured to supply compressed air through an air hose 208, to paint applicator 212. In various embodiments, the paint applicator 212 can be a paint sprayer. Painting system 200 can also include a pump (not shown) located in the housing 202 that is configured to pump paint from a paint container 204 through a paint hose 206, to the paint applicator 212. A user may then press a trigger 210 to actuate the paint applicator 212 to spray the paint onto a given surface using the compressed air.

Figure 3:
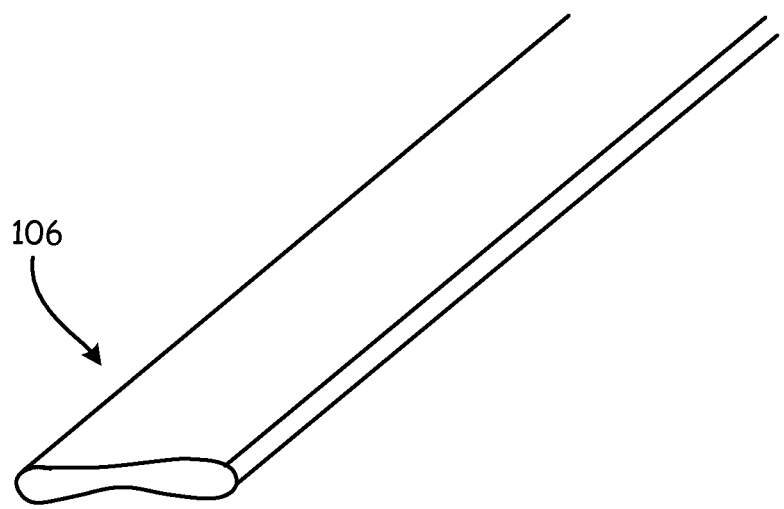
FIG. 3 depicts a portion of an outlet hose in a collapsed or flattened configuration, consistent with embodiments of the present disclosure.
Figure 4:
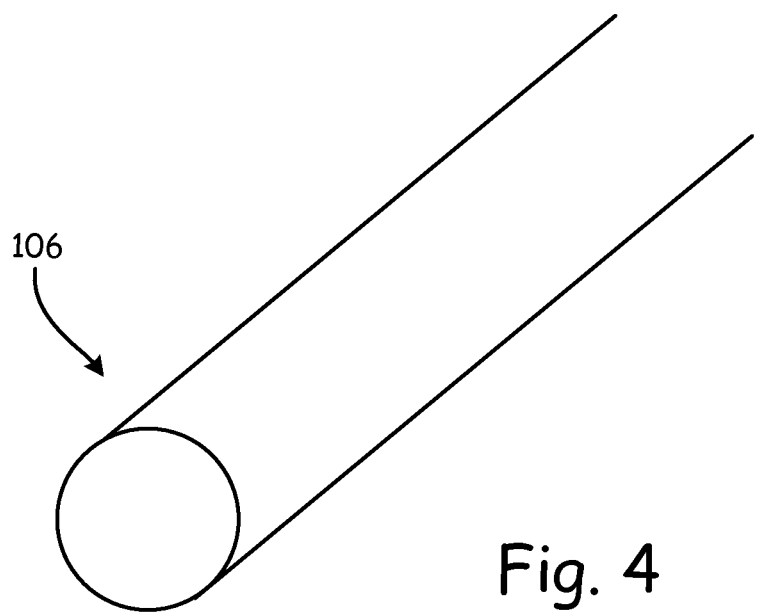
FIG. 4 depicts a portion of the outlet hose in an expanded or open configuration, consistent with embodiments of the present disclosure.

FIGS. 3 and 4 illustrate a portion of outlet hose 106, consistent with embodiments of the present disclosure. In FIG. 3, the outlet hose 106 is depicted in a collapsed or flattened configuration when little or no pressure is present within the hose. In FIG. 4, the outlet hose 106 is in an expanded or open configuration when a threshold pressure is present within the hose. According to various embodiments, when the outlet hose 106 is in a collapsed state as depicted in FIG. 3, in an expanded state as depicted in FIG. 4, or in another state in between the collapsed state and the expanded state (not shown), the conduit wall does not have any edges, corners, or sharp angles. In certain embodiments, the changing of state of the outlet hose 106 from the collapse state to the expanded state, and vice versa, can cause the material of the conduit wall to wear and possible crack or break. In particular embodiments, the conduit wall can be configured to alleviate the outlet hose 106 from having or developing edges, corners, or sharp angles where stress and bending may be at a maximum. As a result, the amount of wear that the outlet hose 106 experiences can be mitigated, decreasing the number of cracks and break, and possibly extending the life of the outlet hose 106. In addition, the removal of left over portions of paint in the outlet hose 106 is facilitated because paint may be less likely to be trapped by the corners and sharp angles, allowing the solvent to more effectively remove the portions from the outlet hose 106.

In accordance with one embodiment, outlet hose 106 is configured such that it expands to the open state of FIG. 4 for pressures experienced during a painting application to facilitate maximal paint flow therethrough with minimized pressure drop. The threshold pressure at which hose 106 reaches the fully open state can be chosen based on the application. For example, but not by limitation, in the exemplary painting system 100 shown in FIG. 1, the pump has an outlet pressure at or above approximately 100 pounds per square inch (psi). In one exemplary configuration, hose 106 is substantially fully open at a pressure that is greater than or equal to the outlet pressure of 100 psi. In one embodiment, hose 106 is configured such that it is substantially fully open at a pressure that is greater than or equal to approximately 20 psi. However, the configuration of hose 106 can be such that it becomes substantially fully opened at pressures below 20 psi.

It is noted that the pressures and threshold ranges discussed herein are provided for the sake of illustration and are not intended to limit the scope of the contents described herein. For example, outlet hose 106 is illustratively described herein in the context of use with a pump that outputs paint at a pressure greater than or equal to approximately 100 psi. Although not by limitation, it is noted that in one embodiment hose 106 can be configured for use with an airless sprayer that operates at pressures above 500 psi. In this case, hose 106 can be configured to have a higher threshold at which it achieves its fully opened configuration.

Outlet hose 106 is configured such that it remains at least partially collapsed (i.e., a smaller inner cross-sectional area than the fully open state) at lower fluid pressures, such as when outlet hose 106 is exposed to a solvent flow, such as water. For instance, in an exemplary cleaning operation of painting system 100, paint applicator 108 is removed from outlet hose 106 and an inlet hose for the pump is placed in a source of water or other solvent. The pump is operated to pump the water through outlet hose 106. Advantageously, outlet hose 106 does not expand fully, thus acting like a smaller diameter hose. The reduced inner cross-section of outlet hose 106 encourages a higher solvent flow rate than if the hose 106 was fully opened. This can result in less water or other solvent being required for cleaning and can speed up the cleaning process. Also, the reduced inner cross-section creates a higher velocity flow which can result in a more efficient cleaning process.

A threshold range at which hose outlet 106 remains at least partially collapsed can be selected based on the application, such as expected water or other solvent pressure during user cleaning. By partially collapsed, it is meant that the inner cross-sectional area of hose 106 is less than its fully open cross-section. In one particular example, the solvent pressure in hose 106 during cleaning is between approximately 2 and 5 psi.

In one embodiment, outlet hose 106 maintains a partially collapsed state with a fluid flow at a pressure that is below 20 psi. In one particular example, outlet hose maintains a partially collapsed state with a fluid flow at a pressure that is greater than approximately 2 psi, but less than approximately 10 psi.

In one embodiment, the partially collapsed state of outlet hose 106 during the cleaning process comprises an inner cross-sectional area that is less than or equal to approximately 75% of its fully open cross-section. In one embodiment, the partially collapsed state of outlet hose 106 during the cleaning process comprises an inner cross-sectional area that is less than or equal to approximately 50% of its fully open cross-section. In one example, the partially collapsed state of outlet hose 106 during the cleaning process comprises an inner cross-sectional area that is less than or equal to approximately 25% of its fully open cross-section.

According to various embodiments, when the outlet hose 106 is in its collapsed or flattened state, the cross-section of the conduit wall can take on an appearance similar to a "peanut" or a "dog bone" shape. This continuous (i.e., lacking edges or points of discontinuities) shape characteristic can allow the outlet hose 106 to change the pressure at which a fluid flows through and out of the outlet hose 106 and possibly prevent the outlet hose 106 from forming an edge, corner, or sharp angle that could induce stress on the conduit wall. Furthermore, as the amount of fluid flowing through the outlet hose 106 increases, the conduit wall can transform from the "peanut" shape collapsed state to intermediate states where the concave portions or "middle" of the conduit wall becomes less concave until the conduit wall reaches a substantially circular shape in its expanded or open state.

FIGS. 5 and 6 are cross-section views of one embodiment of a collapsible hose 400, consistent with embodiments of the present disclosure. FIG. 5 illustrates hose 400 in the fully open state and FIG. 6 illustrates hose 400 in a collapsed state, such as when a pressure below 10 psi is present in hose 400. By way of example, but not by limitation, hose 400 has an inner diameter 402 of approximately 10 millimeters (mm). In other examples, however, inner diameter 402 can be greater than or less than 10 mm.

Referring to the embodiment of FIG. 6, hose 400 has a non-circular, "peanut" shape, cross-section in its collapsed state. In particular embodiments, hose 400 can have four inflection points represented by lines 416, 418, 420, and 422. As pressure inside hose 400 increases, hose 400 expands radially (generally represented by arrows 403) thereby changing the inner surface shape of hose 400 and increasing its inner cross sectional area, until hose 400 reaches its fully expanded state shown in FIG. 5. In certain embodiments, when the hose 400 has reached its fully expanded state, inflection points 416, 418, 420, and 422 no longer exist.

Hose 400 can be formed of an elastic material that tends to return to its original size and shape upon removal of pressure. While hose 400 can be formed of any suitable material, in the illustrated embodiment, but not by limitation, hose 400 is formed of a polymer, such as polyurethane, using an extrusion process. In one embodiment, the material of hose 400 has a hardness greater than 50 Shore A. In one particular example, the material has a hardness of approximately 80-90 Shore A, with a tensile strength greater than or equal to approximately 35 megapascals (MPa). Inner surfaces 412 of walls 414 are high gloss to reduce friction and pressure drop along hose 400.

In the illustrated embodiment, hose 400 includes a feature 404 that is configured to hold a power cord. Feature 404 is illustratively an "open C" shape with an opening 406 sized to receive and retain the power cord. Hose 400 also includes a feature 408 for holding an air switch for operating a pump. For example, with respect to painting system 100, an air switch comprises a button 110 on applicator 108 and an air supplying cord (not shown) from applicator 108 to housing 102 through which the pump is operated in response to actuation of button 110. The cord can be positioned within an aperture 410 along a length of hose 400.

Figure 7:
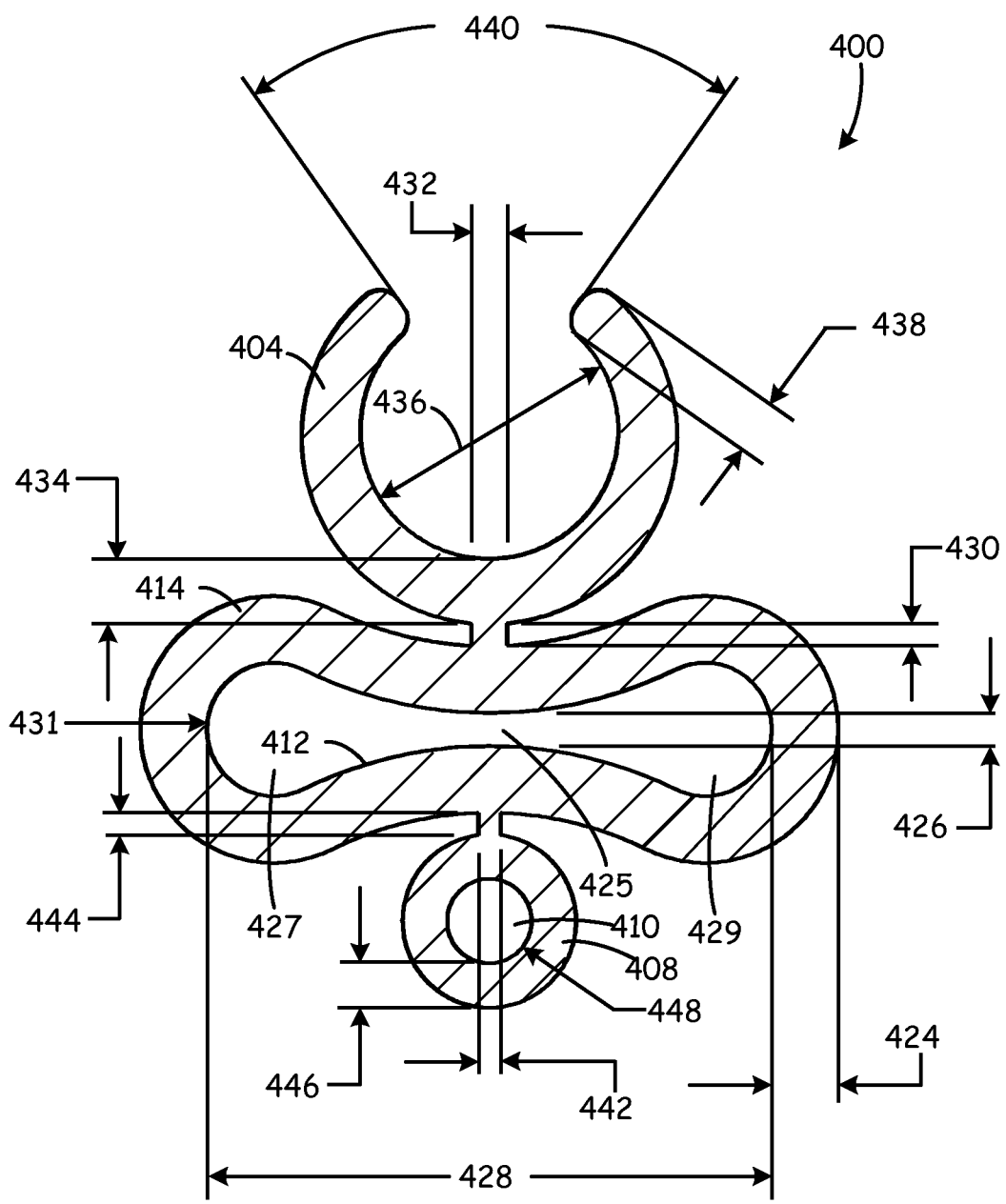
FIG. 7 depicts a cross-section view of an embodiment of the collapsible hose in a collapsed state with exemplary dimensions, consistent with embodiments of the present disclosure.

FIG. 7 provides a view of hose 400 similar to FIG. 6. FIG. 7 and includes exemplary dimensions of hose 400, consistent with embodiments of the present disclosure. It is noted that these dimensions are provided for the sake of illustration and are not intended to limit the scope of the concepts described herein.

In the collapsed state illustrated in FIG. 7, the inner space of hose 400 is formed by a pair of generally circular regions 427 and 429 connected by a relatively narrow region 425. Illustratively, the inner surfaces 412 of walls 414 are free of sharp angles or corners to reduce material stresses during expansion and contraction.

Illustratively, the generally circular regions 427 and 429 have a radius 431 of approximately 1.5 mm and the wall surfaces that form region 425 remain spaced apart a distance 426, in the absence of internal hose pressure. In one example, distance 426 is approximately 0.75 mm and the distance 428 across the generally "peanut" or "dog-bone"-shaped inner space is approximately 12.7 mm. An exemplary thickness 424 of walls 414 is approximately 1.5 mm.

A portion of hose 400 that connects feature 404 and walls 414 has a length 430 and thickness 432 of approximately 0.5 and 0.8 mm, respectively. Feature 404 has a thickness 434 of approximately 1.45 mm and a diameter 436 of approximately 5.8 mm to retain a power cord. The thickness 438 of feature 404, proximate the ends, is approximately 1.2 mm. The ends are positioned apart by an angle 440 of approximately 70 degrees to receive the power cord.

A portion of hose 400 that connects feature 408 and walls 414 has a thickness 442 and length 444 that are both approximately 0.5 mm. The thickness 446 of feature 408 is approximately 1 mm and the aperture 410 has a diameter 448 of approximately 1.9 mm for holding a cord of an air switch.

Again, it is noted that these dimensions are provided for the sake of illustration and are not intended to limit the scope of the concepts described herein.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A flexible paint hose, the paint hose comprising:
   a first end;
   a second end;
   a continuous conduit wall extending from the first end to the second end, having a cross-section absent of an edge and having a non-circular cross-sectional shape in a first state and a substantially circular cross-sectional shape in a second state, wherein the conduit wall is configured to retain the first state when a first pressure of liquid is applied, and retain the second state when a second pressure of liquid is applied, and wherein both of the first and second pressures of fluid are greater than atmospheric pressure;
   a first feature having an opening configured to receive a power cord and a diameter configured to hold the power cord, wherein the first feature comprises a partial conduit; and
   a second feature configured to hold an air supplying cord, wherein the second feature comprises a circular conduit.

2. The flexible paint hose of claim 1, wherein the second pressure is greater than the first pressure.

3. The flexible paint hose of claim 1, wherein the absence of the edge alleviates stress on a material of the flexible paint hose.

4. The flexible paint hose of claim 1, wherein a radius of the partial conduit is greater than a radius of the circular conduit.

5. A flexible paint hose, the paint hose comprising:
   a first end;
   a second end;
   a conduit wall extending from the first end to the second end and having a first cross-sectional shape with at least two inflection points in a collapsed state, wherein the conduit wall is configured to maintain the collapsed state at a first fluid pressure and expand to an open state at a second fluid pressure;
   a partial conduit having an opening configured to receive a power cord and a diameter configured to hold the power cord, wherein the partial conduit extends such that the power cord extends parallel to the conduit wall; and
   a circular conduit, configured to hold an air supplying cord, wherein the circular conduit extends such that the air supplying cord extends parallel to the conduit wall.

6. The flexible paint hose of claim 5, wherein the first cross-sectional shape has at least two additional inflection points in a collapsed state.

7. The flexible paint hose of claim 6, wherein the conduit wall has a second cross-sectional shape with no inflection points in the open state.

8. The flexible paint hose of claim 5, wherein the conduit wall has a second cross-sectional shape with no inflection points in the open state.

9. The flexible paint hose of claim 5, wherein the flexible paint hose is formed of a polymer using an extrusion process.

10. The flexible paint hose of claim 5, wherein the first cross-sectional shape is continuous, absent of an edge.

11. A paint hose, the paint hose comprising:
    a first end;
    a second end;
    a conduit wall extending from the first end to the second end and having a cross-section, in a collapsed state, shaped like a peanut, wherein the conduit wall is configured to maintain the collapsed state below a first pressure, and wherein the conduit wall is configured to convert to an open state above a second pressure;
    a first feature having an opening configured to receive a power cord and a diameter configured to hold the power cord, wherein the first feature comprises a C-shaped, open conduit; and
    a second feature configured to hold an air supplying cord, wherein the second feature comprises a closed circular conduit, wherein the closed circular conduit has a first radius that is smaller than a second radius of the open conduit.

12. The paint hose of claim 10, wherein the cross-section of the conduit wall has a substantially circular shape in the open state.

13. The paint hose of claim 11, wherein the cross-section of the conduit wall has a set of shapes corresponding to a set of intermediate states in between the collapsed state and the open state, each intermediate state having at least one shape from the set of shapes.

14. The paint hose of claim 11, wherein the paint hose is formed of a polymer using an extrusion process.

15. The paint hose of claim 10,
wherein the closed conduit is substantially opposite the open conduit with respect to the paint hose.

16. A method of using a flexible paint hose having a conduit wall, the method comprising:
connecting the flexible paint hose to a paint system having a paint source containing paint, wherein connecting the flexible paint hose to a paint system also comprises coupling a power cord to a power cord receiving feature, coupling an air supplying cord to an air supplying cord feature, wherein the power cord receiving feature comprises a partial conduit, and the air supply cord comprises a closed conduit, and wherein the power cord and air supplying cord are coupled such that they extend substantially parallel to the flexible paint hose;
conveying the paint through the flexible hose at a first liquid pressure sufficient to expand the conduit wall radially to a substantially circular shape;
connecting the flexible paint hose to a solvent system having a solvent source containing solvent;
conveying the solvent through the flexible hose at a second liquid pressure sufficient such that the conduit wall reverts to, and maintains, a collapsed state, wherein the collapsed state has a smaller cross-sectional area than the substantially circular shape; and
removing a remaining portion of the paint from the flexible paint hose in response to the pumping of the solvent.

17. The method of claim 16, wherein the paint system is the same as the solvent system.

18. The method of claim 16, wherein an inlet hose is placed in the solvent source and the paint system pumps the solvent through the flexible paint hose.

19. The method of claim 16, and further comprising:
disconnecting the flexible paint hose from the paint system.

20. The method of claim 16, wherein the paint system uses a peristaltic pump to pump the paint through the flexible paint hose.

21. The method of claim 16, wherein the conduit wall is continuous, absent of an edge.

* * * * *